(12) United States Patent
Tomita

(10) Patent No.: US 10,817,776 B2
(45) Date of Patent: Oct. 27, 2020

(54) ARITHMETIC PROCESSING CIRCUIT AND INFORMATION PROCESSING APPARATUS

(71) Applicant: FUJITSU LIMITED, Kawasaki-shi, Kanagawa (JP)

(72) Inventor: Yasumoto Tomita, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 689 days.

(21) Appl. No.: 15/418,969

(22) Filed: Jan. 30, 2017

(65) Prior Publication Data
US 2017/0228634 A1    Aug. 10, 2017

(30) Foreign Application Priority Data

Feb. 5, 2016    (JP) .................................. 2016-020444

(51) Int. Cl.
*G06N 3/04*    (2006.01)
*G06N 3/063*    (2006.01)
*G06N 3/08*    (2006.01)

(52) U.S. Cl.
CPC ........... *G06N 3/0454* (2013.01); *G06N 3/063* (2013.01); *G06N 3/084* (2013.01)

(58) Field of Classification Search
CPC ....... G06N 3/063; G06N 3/084; G06N 3/0454
See application file for complete search history.

(56) References Cited

U.S. PATENT DOCUMENTS

| | | | |
|---|---|---|---|
| 5,355,528 A | 10/1994 | Roska et al. | |
| 5,553,156 A * | 9/1996 | Obata .................. | G06K 9/6255 382/119 |
| 7,739,324 B1 * | 6/2010 | Das ....................... | G06F 7/5443 708/603 |

(Continued)

FOREIGN PATENT DOCUMENTS

| | | |
|---|---|---|
| EP | 1 329 965 A1 | 7/2003 |
| JP | 8-505248 | 6/1996 |
| WO | WO 02/35616 A1 | 5/2002 |

OTHER PUBLICATIONS

LeCun, Yann, et al. "Learning algorithms for classification: A comparison on handwritten digit recognition." Neural networks: the statistical mechanics perspective 261 (1995): 276. (Year: 1995).*

(Continued)

*Primary Examiner* — Austin Hicks
(74) *Attorney, Agent, or Firm* — Staas & Halsey LLP

(57) ABSTRACT

The arithmetic processing circuit includes a first layer configured to dispose a learning neural network to compute a coefficient to be set in a recognition neural network, configured to recognize input data by using the coefficient computed on a basis of a recognition result of the recognition neural network with for the input data serving as a reference for computing the coefficient and a recognition result serving as a reference for the input data serving as the reference. The circuit further includes a second layer configured to dispose the recognition neural network to recognize the input data by the coefficient computed by the learning neural network. The circuit still further includes a third layer disposed between the first layer and the second layer, and configured to dispose a memory connected to both of the learning neural network and the recognition neural network.

5 Claims, 14 Drawing Sheets

(56) References Cited

U.S. PATENT DOCUMENTS

2012/0146707 A1* 6/2012 Riho .................. G11C 5/02
                                                    327/419
2015/0331832 A1* 11/2015 Minoya ................ G06F 17/10
                                                    706/16

OTHER PUBLICATIONS

LeCun, Yann, et al. "Learning algorithms for classification: A comparison on handwritten digit recognition." Neural networks: the statistical mechanics perspective 261 (1995): 276. (Year: 1995).*

* cited by examiner

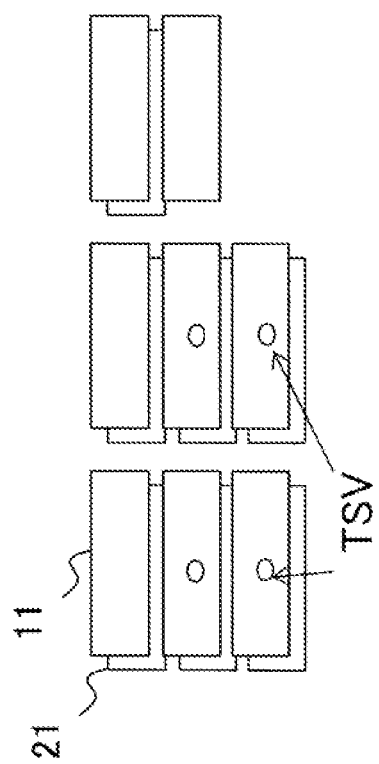

ARITHMETIC PROCESSING CIRCUIT AND INFORMATION PROCESSING APPARATUS

CROSS-REFERENCE TO RELATED APPLICATIONS

This application is based upon and claims the benefit of priority of the prior Japanese Patent Application No. JP2016-020444, filed on Feb. 5, 2016, the entire contents of which are incorporated herein by reference.

FIELD

The present invention relates to an arithmetic processing circuit and an information processing apparatus.

BACKGROUND

Internet of Things (IoT) comes to reality, in which various items of data are acquired from various categories of things, and as a result of which there arise concerns about machine learning for analyzing big data. In the machine learning, there is developed a learning technology in a neural network (NN) simulating a region of a brain of a human being that handles a visual sense. For example, the neural network recognizes features of images that are newly input to the neural network, and distinguishes a specific image from other images by learning the images.

The neural network is superior to existing image recognition techniques in terms of accuracy. However, the neural network has a problem of entailing a large quantity of computation. For example, processing by a Central Processing Unit (CPU) involves executing the computation for a long period of time in a learning phase. Such being the case, an accelerator is used for reducing computation time.

The conventional accelerator of the neural network adopts, e.g., a System-on-a-Chip (SoC) by which all of neural networks are packaged on one chip. The SoC attains acceleration by decreasing a distance between a memory and data. Further, a Silicon in Package (SiP) technology attains the acceleration by connecting a logical circuit chip to a memory chip via Through Silicon Via (TSV) and thereby decreasing a distance between the memory that stores processing target data and a computing circuit of the neural network.

DOCUMENTS OF PRIOR ARTS

Patent Documents

[Patent Document 1] Japanese National publication of Translated Version of PCT International Application No. H08-505248
[Patent Document 2] International Publication WO2002/035616

SUMMARY

One aspect of the technology of the disclosure is exemplified by an arithmetic processing circuit. The arithmetic processing circuit includes a first layer configured to dispose a learning neural network to compute a coefficient to be set in a recognition neural network, wherein the recognition neural network is configured to recognize input data by using the coefficient computed on a basis of a recognition result of the recognition neural network with respect to the input data serving as a reference for computing the coefficient and a recognition result serving as a reference with respect to the input data serving as the reference. The arithmetic processing circuit further includes a second layer configured to dispose the recognition neural network to recognize the input data by the coefficient computed by the learning neural network. The arithmetic processing circuit still further includes a third layer disposed between the first layer and the second layer, and configured to dispose a memory connected to both of the learning neural network and the recognition neural network.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 14 is one example of a plan view of chips of the neural network.

DESCRIPTION OF EMBODIMENT(S)

For example, a neural network may adopt an Embedded Dynamic Random Access Memory (eDRAM) for increasing a memory capacity as the case may be. The memories like the eDRAMs and logical circuits are packaged in mixture, which leads to a rise in cost for processes. Further, paths to the logical circuits from the eDRAMs are arranged as a bundle of wires, and hence a usage efficiency of a planar dimension of a chip decreases.

On the other hand, an example of neural network may adopt a SiP technology. The SiP technology separates the chips (memories, logical circuits and other equivalent components) as components of the neural network, and is therefore low in cost because a process of SoC can use a normal process owing to an introduction of this SiP technology. However, the neural network based on the SiP technology also has co-existence of a recognition circuit and a learning circuit. The learning circuit is not therefore used in a recognition phase, and hence the usage efficiency of the planar dimension of the chip decreases.

According to one aspect, a technology of the disclosure of the present embodiment aims at attaining acceleration and an improvement of a usage efficiency of a planar dimension of a chip at a low cost in a neural network.

An information processing apparatus according to one embodiment will hereinafter be described with reference to the drawings. A configuration of the following embodiment is an exemplification, and the present information processing apparatus is not limited to the configuration of the embodiment. A neural network according to the embodiment will hereinafter be described in comparison with a comparative example.

Comparative Example

Figure 1:
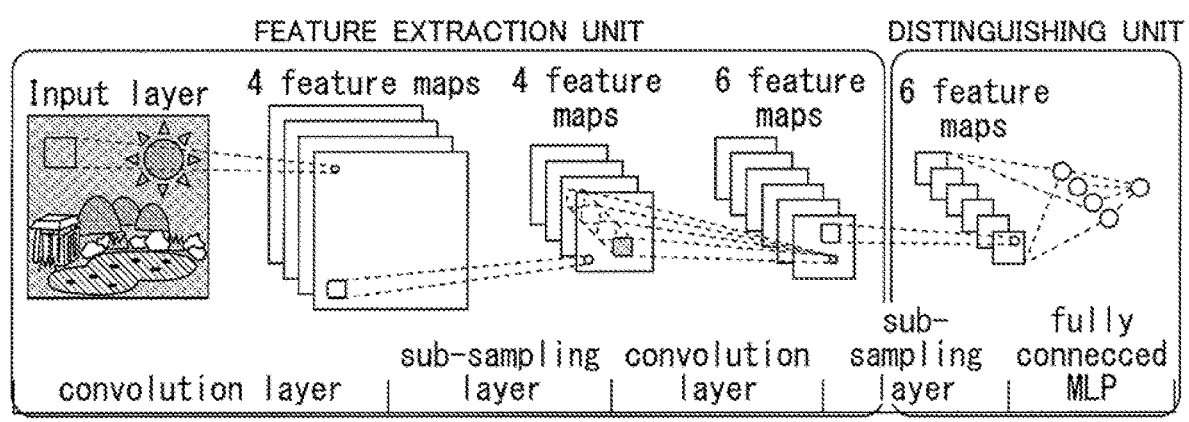
FIG. 1 is a diagram illustrating processes of a neural network according to a comparative example.

FIG. 1 illustrates processes of the neural network according to the comparative example. The neural network implements forward propagation processes for recognizing and distinguishing between images, and backward propagation processes for determining parameters used in the forward propagation processes. Note that the backward propagation processes are called a Back Propagation (or Backward Propagation abbreviated to BP) algorithm.

The neural network in FIG. 1 implements processes of convolutional layers and processes of pooling layers with respect to input images, thereby extracting features of the images and distinguishing between the images. That is to say, FIG. 1 illustrates the forward propagation processes. In FIG. 1, input images received by input layers are to be processed by convolutional layers and pooling layers, whereby 4 feature maps and 6 feature maps are sequentially generated. The feature maps are data transferred and received at different channels of videos, or alternatively data corresponding to R, G, B data and other equivalent data. The neural network in FIG. 1 outputs recognition results from a fully connected Multi-Layer Perceptron (MLP) as a last layer. Note that the pooling layer is also called a Sub-sampling Layer. The last layer is also called a Fully connected layer.

Computing circuit units to iteratively execute processes of the convolutional layers and the processes of the pooling layers up to the last layer in the forward propagation processes are called feature extraction units. To be specific, the feature extraction units iteratively execute the processes of the convolutional layers and the processes of the pooling layers for the input images, thereby extracting downsampled images. The process of the convolutional layer is also called a convolutional computation. The process of the pooling layer is called a pooling computation or subsampling computation.

More specifically, the feature extraction units implement the convolutional computations using, e.g., weighting filters of an (a×b) number of weights $w_{ab}$ (a, b=0, . . . , m−1) for information of the images having an (N×N) number of pixels of a certain layer (a (l−1)th layer) in the forward propagation. The feature extraction units implement the convolutional computations, and thereby generate the image information of a next layer (an l-th layer) from the images of the layer (the (l−1)th layer) in active processing. Processing results by the convolutional computations are converted by a non-linear activation function "y=sigma(x)" and are modeled as called "firing". The non-linear activation function is defined by, e.g., sigma(x)=max(0,x). To be specific, the non-linear activation function "y=sigma(x)" is a function that is sigm(x)=0 when "x" takes a negative value and is sigma(x)=x when "x" takes a positive value. Note that the weight "w" is used for the convolutional computation and can be therefore called a coefficient "w".

<Computation of Convolutional Layer>

Now, let $y^{l-1}_{i,j}$ be an output from pixels (i,j) of the (l−1)th layer, let $x^{l}_{i,j}$ be a processing result of the convolutional computation of the pixels (i,j) of the l-th layer, and let $y^{l}_{i,j}$ be a computation result, using the non-linear activation function "y=sigma(x)", of the pixels (i,j) of the l-th layer. The results $x^{l}_{i,j}$ and $y^{l}_{i,j}$ can be expressed by the following (Expression 1) and (Expression 2). However, a function "sigma" is notated by Greek characters in the (Expression 2).

$$x^{l}_{ij} = \sum_{a=0}^{m-1} \sum_{b=0}^{m-1} \omega_{ab} y^{l-1}_{(i+a)(j+b)}$$ [Mathematical Expression 1]

(Expression 1) Convolutional Layer $$y_{i,j}^{l} = \sigma(x_{i,j}^{l})$$ [Mathematical Expression 2]

(Expression 2) Convolutional Layer

In the image information of the (l−1)th layer as a processing target by the Expression 1, an area of the (m×m) number of pixels will hereinafter be called a unit rectangular area. Incidentally, it does not mean that the unit rectangular area is limited to one feature, and, when the 4 feature maps and the 6 feature maps illustrated in FIG. 1 become targets of the convolutional computation, the convolutional computation may be implemented by using a plurality of feature maps. The pixel will hereinafter be also termed a cell. The unit rectangular area is one example of "part of array data". The pixels or the cells are one example of "elements of the array data".

The pooling computation is a process of subsampling (thinning) an image having an (N×N) number of pixels down to an image having an (N/k×N/k) number of pixels. A subsampling method can be exemplified by a process of segmenting the (N×N) number of pixels into image segments each having a (k×k) number of pixels, and selecting one pixel having a maximum pixel value in the (k×k) number of pixels contained in each image segment (which will hereinafter be called max pooling), and a process of generating one pixel by an average value of the (k×k) number of pixels.

A distinguishing unit implements the convolutional computations for all of the pixels in the generated subsampled image by applying the weights to the respective pixels, thereby acquiring output values. Now, let $y^{l-1}_{j}$ be a pixel value of the (l−1)th layer when the (l−1)th layer is the last layer of the feature extraction unit, $x^{l}_{i}$ be a result of the convolutional computation by the Fully connected layer, and $w^{l-1}_{ji}$ be a weight, and $x^{l}_{i}$ can be expressed by the following (Expression 3).

$$x^{l}_{i} = \sum_{j} w^{l-1}_{ji} y^{l-1}_{j}$$ [Mathematical Expression 3]

(Expression 3) Fully Connected Layer

Further, let $y^l_i$ be a computation result of the non-linear activation function "y=sigma(x)" in the distinguishing unit, and the computation result $y^l_i$ in the distinguishing unit can be expressed by the following (Expression 4). However, the function "sigma" is notated by Greek characters in the (Expression 4).

$$y^l_i = \sigma(x^l_i) + I^l_i \qquad \text{[Mathematical Expression 4]}$$

(Expression 4) Fully Connected Layer

Herein, $I^l_i$ is a bias component.

Figure 2:
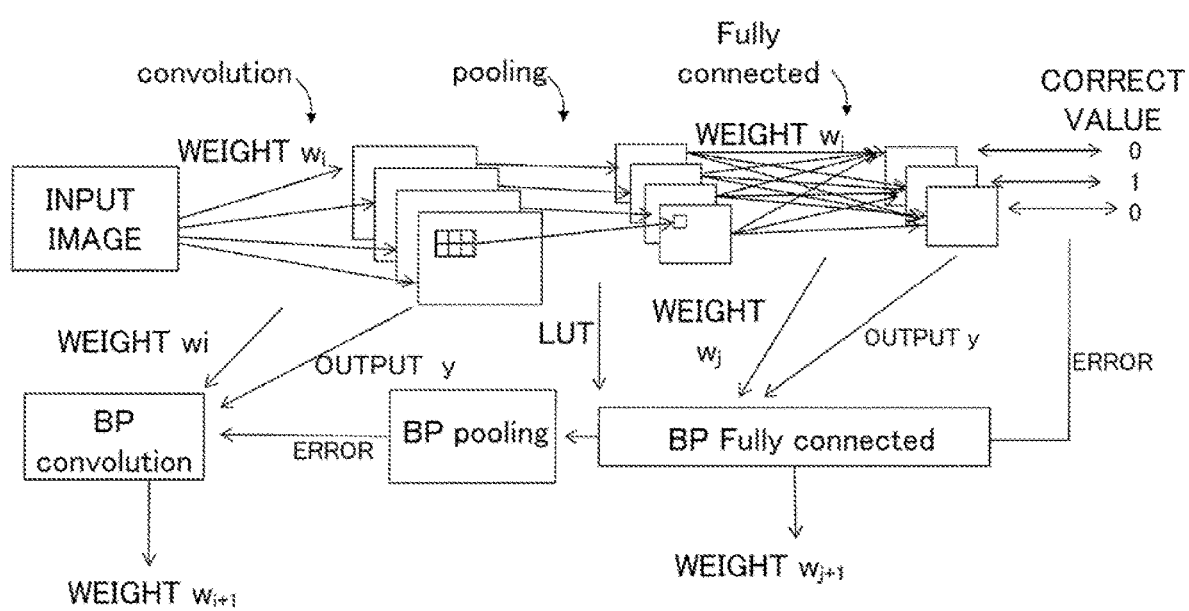
FIG. 2 is a diagram illustrating a learning process in a backward propagation together with a recognition process and a distinguishing process in a forward propagation.

FIG. 2 illustrates a backward propagation (BP) learning process together with a forward propagation recognition process and a forward propagation distinguishing process. The recognition process may be called cognitive process. In the neural network of FIG. 2 also, the forward propagation recognition process is executed by the convolutional layer implementing the convolutional computation on the input image and by the pooling layer executing the subsampling process. The distinguishing process for outputting a distinguishing result is executed by the Fully connected layer (which is described by "Fully connected" in FIG. 2).

A result of the distinguishing process by the Fully connected layer is compared with correct data, and a differential value as a comparison result is output as an error. The error is processed by a learning process. The learning process is a process of computing errors at the forward propagation convolutional layer and the Fully connected layer from the foregoing errors (errors at a layer closer to the Fully connected layer), and next weights at the respective layers. FIG. 2 illustrates one weight $w_i$ at the convolutional layer (one layer) and another weight $w_j$ at the Fully connected layer (one layer) as current weights. Further illustrated are one weight $w_{i+1}$ at the convolutional layer and another $w_{j+1}$ at the Fully connected layer (one layer) as next weights.

Now, when a sum-of-squares (named as E) of differential values of an output value yi as the distinguishing result and correct data Ti is instanced as, e.g., an error evaluation function, a definition can be made as in (Expression 5). The learning process can be considered as a process of determining the weight w for minimizing the error evaluation function instanced in a Mathematical Expression 5.

$$E = 1/2 \sum_i (T_i - y_i)^2 \qquad \text{[Mathematical Expression 5]}$$

(Expression 5)

Next, the (Expression 5) is partially differentiated into an (Expression 6), in which a right-hand represents an error value defined as a difference between the output value yi and the correct data Ti. In the case of generalizing the error evaluation function from the (Expression 5), when the error evaluation function is partially differentiated by the output value yi, it can be considered to likewise obtain the error difference as the difference between the output value yi and the correct data Ti.

$$\frac{\partial E}{\partial y^L_i} = \frac{d}{dy^L_i} E(y^L) \qquad \text{[Mathematical Expression 6]}$$

(Expression 6)

The (Expression 5) is further partially differentiated by $x_i$, then a transitive law of an (Expression 7) is applied, and, when the (Expression 4) is substituted into $y_i$, an (Expression 8) is acquired. Note that an (Expression 9) is acquired in the case of expressing a relation between the pixel value x and the output value y of the non-linear activation function by the (Expression 2).

$$\frac{\partial E}{\partial x^\ell_j} = \sigma'(x^\ell_j) \frac{\partial E}{\partial y^\ell_j} \qquad \text{[Mathematical Expression 8]}$$

(Expression 7)
(Expression 8)

$$\frac{\partial E}{\partial x^\ell_{ij}} = \frac{\partial E}{\partial y^\ell_{ij}} \frac{\partial y^\ell_{ij}}{\partial x^\ell_{ij}} = \qquad \text{[Mathematical Expression 9]}$$

$$\frac{\partial E}{\partial y^\ell_{ij}} \frac{\partial}{\partial x^\ell_{ij}}(\sigma(x^\ell_{ij})) = \frac{\partial E}{\partial y^\ell_{ij}} \sigma'(x^\ell_{ij})$$

On the other hand, when taking it into consideration that the (Expression 5) is partially differentiated by $y^l_i$, and the pixel value $x^l_i$ of the Fully connected layer is expressed as in the (Expression 3) by using the output value $y^{l-1}_j$ given from the (l–1)th layer on one input side, an (Expression 10) is acquired. Note that the pixel value $x^l_{i,j}$ of the l-th layer is expressed as in the (Expression 1) by the output value $y^{l-1}_j$ given from the (l–1)th layer on one input side, in which case the (Expression 10) is transformed into an (Expression 11).

$$\frac{\partial E}{\partial y^\ell_i} = \sum_j w^\ell_{ij} \frac{\partial E}{\partial x^{\ell+1}_j} \qquad \text{[Mathematical Expression 10]}$$

(Expression 10) Fully Connected Layer $$\frac{\partial E}{\partial y^{\ell-1}_{ij}} \sum_{a=0}^{m-1} \sum_{b=0}^{m-1} \frac{\partial E}{\partial x^\ell_{(i-a)(j-b)}} \frac{\partial x^\ell_{(i-a)(j-b)}}{\partial y^{\ell-1}_{ij}} = \qquad \text{[Mathematical Expression 11]}$$

$$\sum_{a=0}^{m-1} \sum_{b=0}^{m-1} \frac{\partial E}{\partial x^\ell_{(i-a)(j-b)}} \omega_{ab}$$

$$\frac{\partial x^\ell_{(i-a)(j-b)}}{\partial y^{\ell-1}_{ij}} = \omega_{ab}$$

(Expression 11) Convolutional Layer

A left-hand of the (Expression 10) represents an error of the l-th layer. A right-hand of the (Expression 10) represents a total of results multiplying an error of an (l+1)th layer by a weight $w_{i,j}$ between the pixel i of the l-th layer and the pixel j of the (l+1)th layer. This total is obtained by totalization with respect to the pixel j of the (l+1)th layer pertaining to the pixel i of the l-th layer.

The (Expression 5) is still further partially differentiated by a weight $w^l_{i,j}$ then the transitive law is applied, and, an (Expression 12) is acquired by substituting the Mathematical Expression 3. However, the (Expression 3) represents the relation between the output y from the (l–1)th layer and the pixel value x of the l-th layer, while the (Expression 12) represents a relation between the output y from the 1st later and the pixel value x of the (l+1)th layer. The (Expression 12) represents a gradient of the error evaluation function E. In the learning process of the neural network based on a steepest gradient descent method, a product of a gradient of the error evaluation function E and a learning coefficient eta (η) becomes a variation of a weight W (a differential value between a current weight Wt and a next weight Wt+1). The gradient of the error evaluation function E is therefore defined as an update quantity deltaW of the weight W. Note that the relation between the pixel value x and the output y is expressed by the (Expression 1), in which case an (Expression 12) is transformed into an (Expression 13). From what has been discussed so far, an (Expression 14) is acquired by applying the steepest gradient descent method to the error evaluation function E. Note that the computation is iterated an M-number of times in an (Expression 14); and, however, M=1 is also available.

$$\frac{\partial E}{\partial w_{ij}^{\ell}} = y_i^{\ell} \frac{\partial E}{\partial x_j^{\ell+1}}$$ [Mathematical Expression 12]

(Expression 12) Fully Connected Layer $$\frac{\partial E}{\partial \omega_{ab}} = \sum_{i=0}^{N-m} \sum_{j=0}^{N-m} \frac{\partial E}{\partial x_{ij}^{\ell}} \frac{\partial x_{ij}^{\ell}}{\partial \omega_{ab}} =$$ [Mathematical Expression 13]

$$\sum_{i=0}^{N-m} \sum_{j=0}^{N-m} \frac{\partial E}{\partial x_{ij}^{\ell}} y_{(i+a)(j+b)}^{\ell-1}$$

(Expression 13) Convolutional Layer $$W_{t+1} = W_t + \frac{\eta}{|M|} \sum_{m=1}^{M} \frac{\partial E}{\partial w_t}$$ [Mathematical Expression 14]

(Expression 14)
(A) Weight of Each Layer

The (Expression 14) represents a relation between the current weight Wt and a weight Wt+1 in the next recognition process. Accordingly, a second term of a right-hand in (Expression 14) is an increment value given to the weight of the next time. The Greek character eta (η) in the (Expression 14) notates the coefficient for obtaining the increment value of the weight Wt from the gradient of the error evaluation function E, and can be set, e.g., empirically and experimentally. To be specific, the learning process involves executing a process of obtaining the weight Wt+1 of the next time by obtaining the gradient in the (Expression 12) and computing the increment value of the second term of the (Expression 11) in such a direction that the error evaluation function E decreases at each of the layers of learning circuits.
(B) Gradient of Error Evaluation Function E of Each Layer (Computation of Update Quantity deltaW)

Herein, the second term of the (Expression 14) is acquired from a product of the pixel value ($y_i^l$) of each layer (the l-th layer) and an error (a partial differential value given by a pixel value $x^{l+1}_j$ of the error evaluation function) of the layer (the (l+1)th layer on one output side with respect to each layer (the l-th layer) by using the (Expression 12). However, a relation between the current layer (the (l−1)th layer in the (Expression 13)) and the upper layer (the l-th layer in the (Expression 13)) which is the side closer by one layer to Fully connected layer is expressed by a sum-of-product computation as in the (Expression 1), in which case the update quantity deltaW is expressed by the (Expression 13). In other words, the update quantity deltaW is equivalent to a total of contributions to the errors from the pixel value $x^l_{i,j}$ of the l-th layer in relation to the output value $y^{l-1}_{i,j}$ of the pixels of the current layer (the (l−1)th layer).
(C) Error of Each Layer On the other hand, the left-hand of the (Expression 10) represents errors (each corresponding to a partial differential value by the pixel value $y^l_i$ of the error evaluation function) of each layer (the l-th layer). The right-hand of the (Expression 10) represents a total of products of the errors (each corresponding to a partial differential value by the pixel value $x^{l+1}_j$ of the error evaluation function) of the layer (the (l+1)th layer) that is closer by one layer to output side with respect to the current layer (the l-th layer) and the weights wi,j between the pixel i of the l-th layer and the pixel j of the (l+1)th layer. This total is obtained by totalization with respect to the pixel j of the (l+1)th layer pertaining to the pixel i of the l-th layer.

In other words, the neural network in the comparative example can obtain the increment value of the weight of each layer on the basis of the error as the difference between the distinguishing value and the correct data illustrated in FIG. 2. To be specific, the neural network in the comparative example can obtain the next weight Wt+1 from the current weight Wt at each layer according to the (Expression 14) by computing the errors of the layer that is closer by one layer to input side according to the (Expression 10) and obtain the gradient (the update quantity deltaW) of the error evaluation function according to the (Expression 12) or the (Expression 13). In short, the neural network in FIGS. 1 and 2 has a sum-of-product computing circuit that implements the (Expression 14), the (Expression 12) and the (Expression 10).

<Computation of Pooling Layer>

In the case of selecting maximum values of the pixels from predetermined ranges (each defined by a (k×k) number of pixels) at the pooling layer (this type of subsampling is called "Max-pooling" as compared with "average-pooling"), one pixel having the maximum value is selected from each range defined by the (k×k) number of pixels. Accordingly, the neural network sends the selected pixel values of the pixels on the output side back to the input side in the backward propagation (BP). On the other hand, it may be sufficient that the neural network sends "pixel value=0" back to the input side with respect to the pixels other than the pixels having the selected pixel values. The neural network therefore has the sum-of-product computing circuit or a selector circuit for returning the pixel values and "pixel value=0" on the output side to the input side.

Through the processes described above, the neural network in FIG. 2 executes the learning process for minimizing the error evaluation function E obtained from the comparison between the result of the distinguishing process at the Fully connected layer and the correct data.

Figure 3:
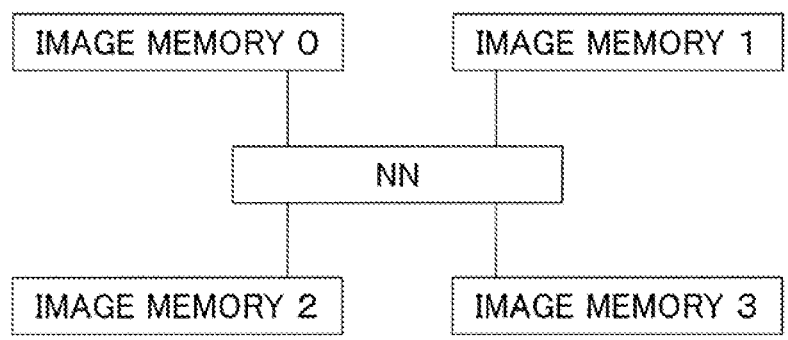
FIG. 3 is a diagram illustrating a configuration of an image recognition apparatus to which the neural network according to the comparative example is applied.

FIG. 3 illustrates a configuration of an image recognition apparatus to which the neural network according to the comparative example is applied. In FIG. 3, image memories 0 through 3 retain image data that are cognized and distinguished by the neural network. As already stated, however, when adopting an eDRAM configuration in FIG. 3, mixed packaging of the memories and logical circuits leads to an increase in process cost. Further, paths to the logical circuits from the eDRAMs are arranged as a bundle of wires, and hence a usage efficiency of a planar dimension of a chip decreases. Moreover, as in FIGS. 2 and 3, when the forward propagation circuits each executing the recognition process and the distinguishing process are intermixed with the backward propagation circuits each executing the learning process in the neural network, the backward propagation learning circuits are kept in an unused status during the execution of the recognition process, resulting in a drop of the usage efficiency of the planar dimension of the chip.

Embodiment

Figure 4:
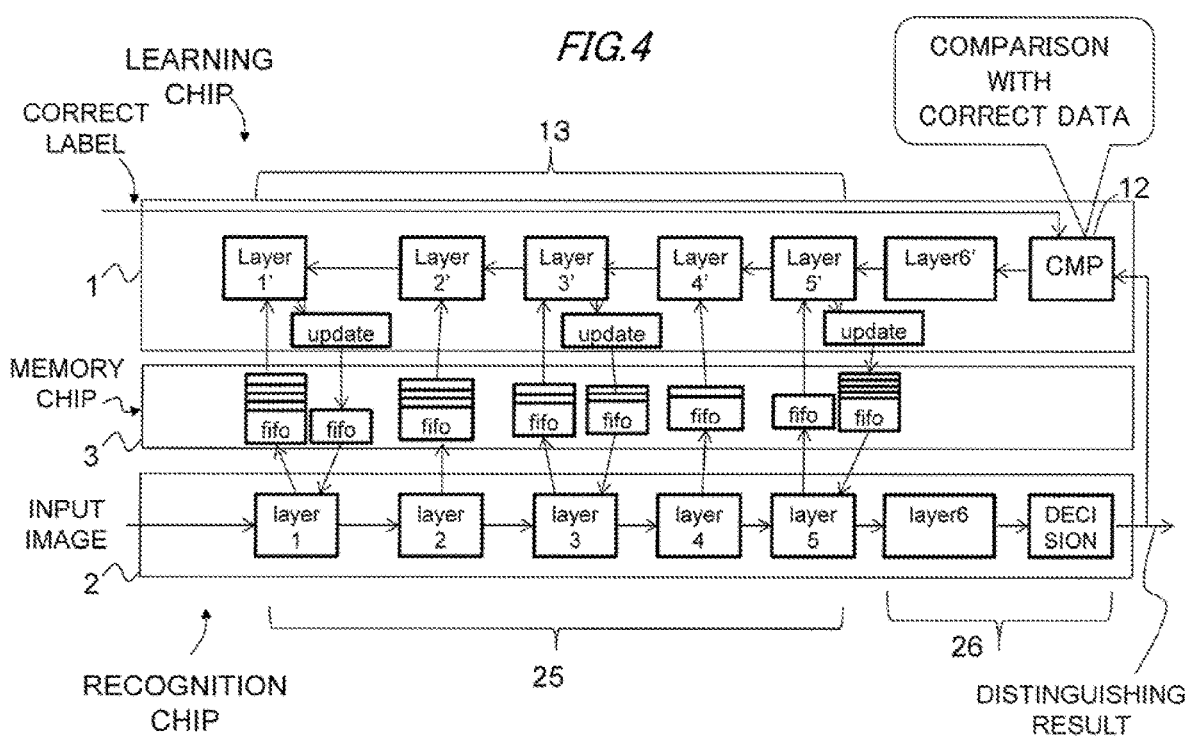
FIG. 4 is a diagram illustrating a neural network according to an embodiment.
Figure 5:
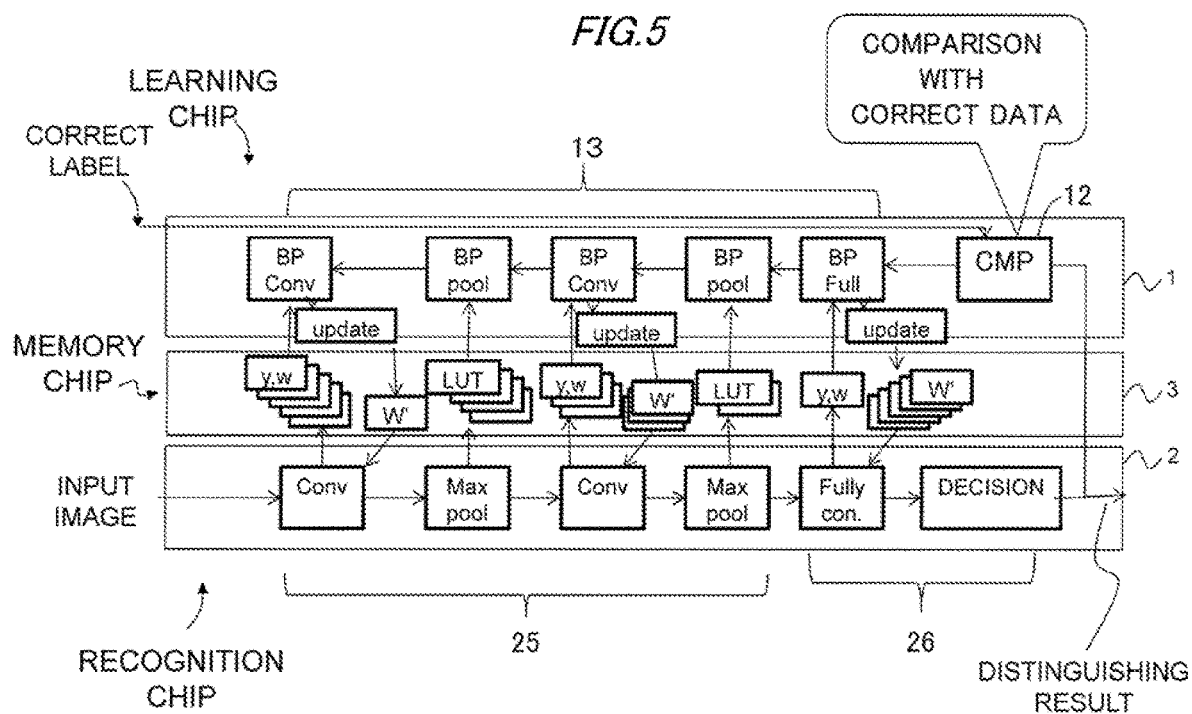
FIG. 5 is a diagram illustrating the neural network according to the embodiment.

A neural network according to a present embodiment will hereinafter be described. The neural network according to the embodiment is one example of "an arithmetic processing circuit". FIGS. 4 and 5 illustrate the neural network according to one embodiment. The neural network includes a learning chip 1, a recognition chip 2 and a memory chip 3. The neural network adopts a 3-dimensional package (System-in-Package (SiP)) technology by which the learning chip 1 is connected to the recognition chip 2, with the memory chip 3 being interposed therebetween. The memory chip 3 has a First in First Out (FIFO) element and is interposed between the learning chip 1 and the recognition chip 2. The FIFO of the memory chip 3 functions as a buffer for adjusting timing.

Note that the processes executed in a learning phase and a recognition phase comply with the Mathematical Expressions 1-14 also in the neural network according to the embodiment. Accordingly, the learning chip 1 computes the next weight Wt according to the (Expression 14), while the recognition chip 2 executes the process of recognizing the input images according to the (Expression 1) through the (Expression 4). The input images are one examples of "input data" and "array data".

The learning chip 1 is one example of "a first layer configured to dispose a learning neural network to compute a coefficient to be set in a recognition neural network, wherein the recognition neural network is configured to recognize input data by using the coefficient computed on a basis of a recognition result of the recognition neural network with respect to the input data serving as a reference for computing the coefficient and a recognition result serving as a reference with respect to the input data serving as the reference". The recognition chip 2 is one example of "a second layer configured to dispose the recognition neural network to recognize the input data by the coefficient computed by the learning neural network". The memory chip 3 is one example of "a third layer disposed between the first layer and the second layer, and configured to dispose a memory connected to both of the learning neural network and the recognition neural network". A recognition neural network may be called cognitive neural network.

The learning chip 1 and the recognition chip 2 each execute a pipeline process. The learning chip 1 includes a comparison circuit 12 to compare the correct data and the recognition result of the recognition chip 2 having recognized the input image. The comparison circuit 12 is one example of "a comparison circuit to compare the recognition result serving as the reference with respect to the input data serving as the reference with an output value for the input data from the output circuit". The learning chip 1 generates the error at each layer and a weight to be handed over to the recognition chip 2 in accordance with the comparison result of the comparison circuit 12. The weight is handed over to the recognition chip 2 via the FIFO. The recognition chip 2 executes the recognition process by using the weight handed over from the learning chip 1 at the respective layers ranging from the layer on the input side down to the Fully connected layer. As in FIG. 5, the recognition chip 2 includes plural pairs of convolutional layers and the pooling layers. A result (y) of the convolutional computation at the convolutional layer is outputted to a high-order pooling layer, and is handed together with the current weight (w) over to the layer (a Back Propagation convolutional layer (BP Conv layer) corresponding to the learning chip 1 via the FIFO. A result of the subsampling process at the pooling layer is handed in the form of LUT (Look Up Table) over to the layer (BP pooling layer) corresponding to the learning chip 1 via the FIFO. A distinguishing result is output from the Fully connected layer as the last layer of the recognition chip 2 and the determination circuit. The Fully connected layer and the determination circuit are generically called an output circuit 26. The output circuit 26 is one example of "an output circuit to compute a sum of product of elements of the reduced array data and a coefficient corresponding to the elements of the reduced array data, and to output an output value with a predetermined function computation".

On the other hand, a computing circuit configured to include an assembly of the convolutional layers (Conv) and the pooling layers (Max pool) on the input side and extending to just before the Fully connected layer (Fully con.), is called a generation circuit 25. The generation circuit 25 is one example of "a generation circuit to generate reduced array data from the array data, being configured by connecting, at a plurality of stages, one or more pairs of a computing circuit to generate a first partial array by a sum-of-product computation of elements contained in part of the array data and the coefficient corresponding to the elements per part of the array data and by a predetermined function computation, and a subsampling circuit to generate a second partial array by subsampling the elements from the first partial array generated per part of the array data".

A computing circuit configured to include an assembly of the backward propagation convolutional layers (BP Conv) and the backward propagation pooling layers (BP pool) excluding the backward propagation Fully connected layers, is called a coefficient generation circuit 13. The error is one example of the differential value. The coefficient generation circuit 13 is one example of a coefficient generation circuit configured by connecting, at a plurality of stages, one or two or more pairs of "a backward propagation computing circuit" and "a restoration circuit to restore the first partial array on a basis of associative relational information representing an associative relation of the subsampling for generating the second partial array from the partial array, and the generated differential values". The coefficient generation circuit 13 is also one example of "a variation generation circuit to generate a of the coefficient from the first partial array generated at each stage of the recognition neural network and the differential value in the first partial array".

As illustrated in FIGS. 4 and 5, in the recognition chip 2, as a layer number increases from a layer 1 receiving an input of the input image, a number of stages of FIFOs decreases. For example, as illustrated in FIGS. 4 and 5, the layer 1 is the convolutional layer (Conv layer); a layer 2 is the pooling layer (max pool layer); a layer 3 is the convolutional layer (Conv layer); a layer 4 is the pooling layer (max pool layer); and a layer 5 is the Fully connected layer (Fully con.), in which case the number of stages of the FIFOs of the results of the convolutional computations in the layer 1 of the recognition chip 2 and the current weights (y, w), which are handed over to the learning chip 1, is "5". The number of stages of the FIFOs of the LUTs generated in the layer 2 of the recognition chip 2, which are handed over to the learning chip 1, is "4". The number of stages of the FIFOs decreases as the layer number increases, and the number of stage of the FIFO of the result of the convolutional computation and the current weight (y, w), which are handed over to the learning chip 1, is "1" in the layer 5. Accordingly, when the layer 5, i.e., the Fully connected layer (Fully con.) implements the convolutional computation of the input image and when the result of the convolutional computation and the current weight (y, w) are set in the FIFO, the values of the FIFOs of the layer 1 through layer 5 are settled and can be handed over to the learning chip 1 together, whereby the learning chip 1 executes the learning process along the pipeline. As described above, the operation that the layer 5, i.e., the Fully connected layer (Fully con.) implements the convolutional computation of the input image; and the result of the convolutional computation and the current weight (y, w) are set in the FIFO, the values of the FIFOs of the layer 1 through layer 5 are settled and can be handed over to the learning chip 1 at the same timing, is one example of "each stage of the recognition neural network hands over the associative relational information, the first partial array (yl) generated by the computing circuit at each stage and the coefficient used in the computing circuit at each stage of the recognition neural network to the computing circuit at each stage of the learning neural network at predetermined operation timing".

Similarly, in the learning chip 1, the number of stages of the FIFOs, which hand over the weight W generated by the Back Propagation layer 5 to the layer 5 of the recognition chip 2 is "5" corresponding to the Fully connected layers of the recognition chip 2. The number of stages of the FIFOs, which hand over the weight W generated by the Back Propagation layer 3 to the layer 3 of the recognition chip 2 is "3". The number of stage of the FIFO, which hands over the weight W generated by the Back Propagation layer 1 to the layer 1 of the recognition chip 2 is "1". Therefore, when the errors based on the results of the determinations about one sheet of image are processed by the layer 1 of the learning chip, new weights $W^l_{t+1}$ of the respective layers are given together at the respective stages of the FIFOs and can be handed over to the recognition chip 2. From on and after the timing when the new weights $W^l_{t+1}$ of the respective layers are given together at the respective stages of the FIFOs, the recognition chip 2 is thereby enabled to execute the recognition process for an input image along the pipeline. The operation that "when the errors based on the results f the determinations about one sheet of image are processed by the layer 1 of the learning chip, new weights $W^l_{t+1}$ of the respective layers are given together at the respective stages of the FIFOs and are handed over to the recognition chip 2" as described above, is one example of "each stage of the learning neural network hands over the coefficient generated by the computing circuit at each stage of the learning neural network to the computing circuit at each stage of the recognition neural network at the predetermined operation timing".

Thus, as the layer of the recognition chip 2 is raised by one, the number of stages of the FIFOs of the results of the convolutional computations and the current weights (y, w) decreases one by one. Such a FIFO's configuration enables starting the execution of the learning process based on the comparison between the processing result of the input image and the correct data at the timing of outputting the distinguishing result of one input image. A configuration that "as the layer of the recognition chip 2 is raised by one, the number of stages of the FIFOs of the results of the convolutional computations and the current weights (y, w) decreases one by one" illustrated in FIGS. 4 and 5, is one example of "a first FIFO (First In First Out) circuit to hand over the associative relational information (LUT), the first partial array (yl) and the coefficient at first operation timing to each stage of the learning neural network from each stage of the recognition neural network".

As the layer of the learning chip 1 is lowered by one, the number of stages of the FIFOs, which hand over the generated weight W to the layer 1 of the recognition chip 2, decreases one by one. With such a FIFO's configuration, when the new weights are generated by the respective layers from the errors (differential values) based on the distinguishing results, the weights of the recognition chip 2 are updated by synchronizing the timing at the entire layers. A configuration that "as the layer of the learning chip 1 is lowered by one, the number of stages of the FIFOs, which hand over the generated weight W to the layer 1 of the recognition chip 2, decreases one by one" illustrated in FIGS. 4 and 5, is one example of "a second FIFO (First In First Out) circuit to hand over the coefficient at second operation timing to each stage of the recognition neural network from each stage of the learning neural network".

Figure 6:
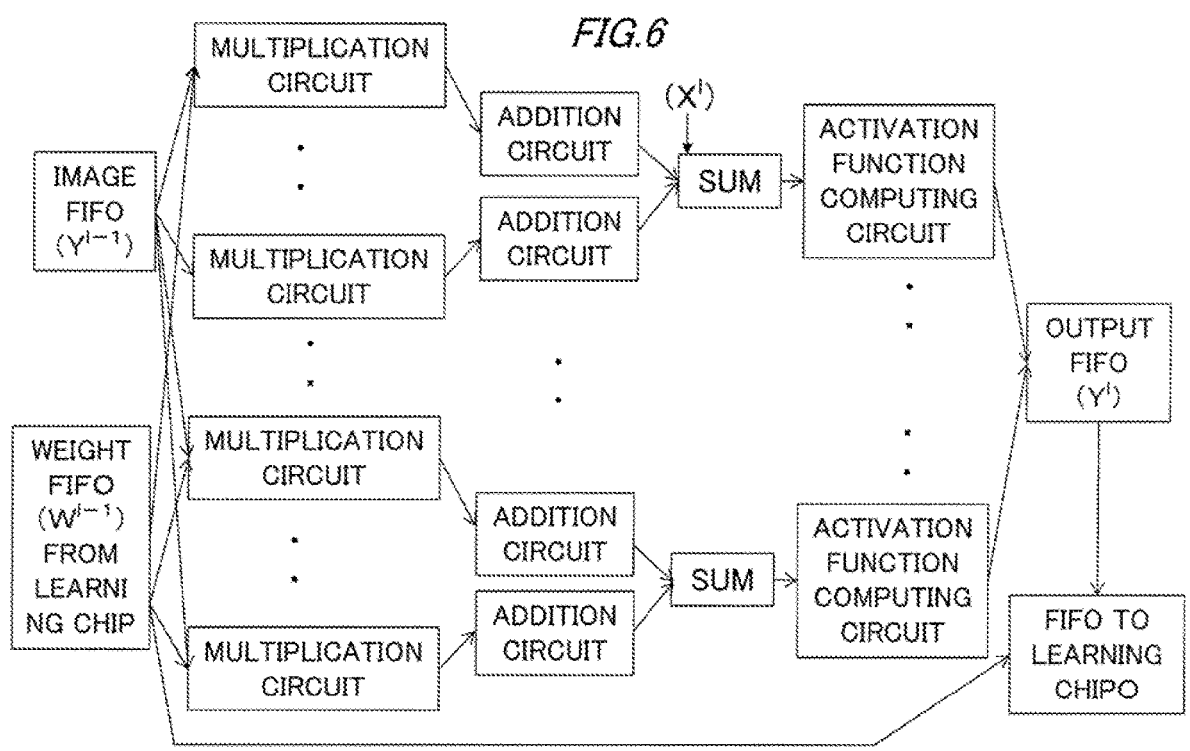
FIG. 6 is a diagram illustrating details of a configuration of a convolutional layer.

FIG. 6 is a diagram illustrating details of the configuration of the convolutional layer (Conv layer) in FIG. 5. In FIG. 6, data ($Y^{l-1}$) of the array (pixel array) of an (a×b) number of pixels output from, e.g., a low-order layer are set in an image FIFO. In this case, image segments each corresponding to the array (unit rectangular area) of the (a×b) number of pixels in the input image are sequentially input to the image FIFO, and the convolutional computation is implemented per image segment. However, such a configuration is also available that all of the pixels (whole pixels) of the input image are set in the image FIFO, and the convolutional layers (Conv layers) implement the convolutional computations in parallel for the plurality of image segments, as convolutional computing targets, contained in the input image.

An (a×b) number of weights (Wab), by which the respective pixels of the array of the (a×b) number of pixels are multiplied, are set in a weight FIFO. The weight Wab is a weight computed in the learning chip 1. A multiplication circuit multiplies the (a×b) number of pixels by the (a×b) number of weights (Wab), and an addition circuit adds a multiplied results, whereby the convolutional process given in, e.g., the (Expression 1) is executed, and a pixel array ($X^l$) is computed. A circuit to compute the activation function given in, e.g., the (Expression 2) generates a pixel array ($Y^l$) from the pixel array ($X^l$), and outputs the generated pixel array ($Y^l$) to the next layer. On the other hand, the weight (Wab) and the pixel array ($Y^l$), which are used by the convolutional layer (Conv layer), are sent to the learning chip 1 via the FIFO.

Figure 7:
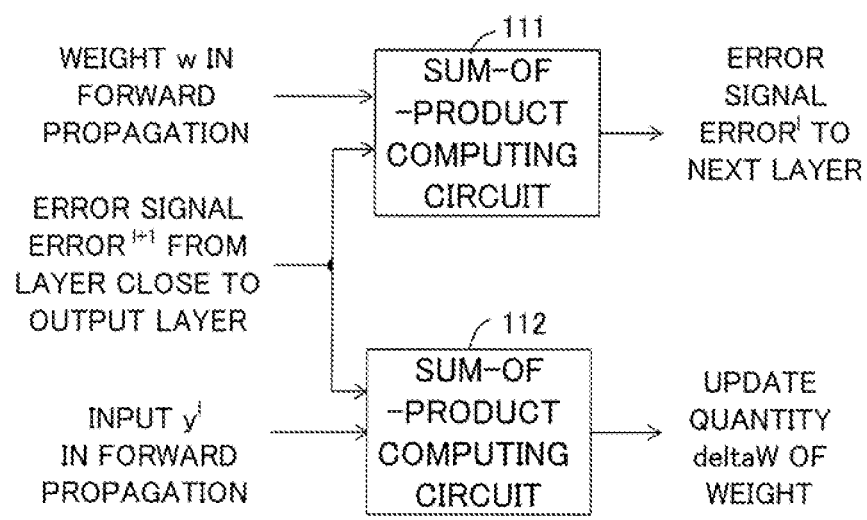
FIG. 7 is a diagram illustrating a configuration of a circuit of a backward propagation convolutional layer.

FIG. 7 is a diagram illustrating a configuration of a circuit of the backward propagation (BP) convolutional layer (BP Conv layer). The backward propagation (BP) convolutional layer (BP Conv layer) has two sum-of-product computing circuits 111, 112. The first sum-of-product computing circuit 111 multiplies the weight w upon the recognition (forward) at the l-th layer by an error signal $ERROR^{l+1}$ given from the (l+1)th layer that is closer by one layer to the output layer, thereby generating an error signal $ERROR^l$ forwarded to the next layer (l-th layer). A process of the first sum-of-product computing circuit 111 is the process corresponding to the Mathematical Expression 10. Note that though omitted in FIG. 7, as given in the Mathematical Expression 11, the (a×b) number of pixels i of the l-th layer are associated with the elements j of the (l+1)th layer by the (a×b) number of weights $w_{a,b}$ through the convolutional computation in the (Expression 1), in which case the circuits get complicated.

To be specific, the error signals $ERROR^l_{a,b}$ of the (a×b) number of pixels i of the l-th layer and the (a×b) number of weights $w_{a,b}$ are inputted to the first sum-of-product computing circuit 111, whereby the first sum-of-product computing circuit 111 implements the sum-of-product computation. An assembly of the first sum-of-product computing circuit 111 and the second sum-of-product computing circuit 112 are one example of "a backward propagation computing circuit to generate the coefficient to be handed over to the output circuit and each stage and the differential value of a first partial array on a basis of the differential value given by the comparison result of the comparison circuit".

The second sum-of-product computing circuit 112 computes the update quantity deltaW of the weight by multiplying the error signal $ERROR^{l+1}$ given from the (l+1)th layer that is closer by one layer to the output layer by the input $y^l$ upon the cognition at the l-th layer. The update quantity deltaW of the weight is handed over to an updater. Note that though omitted in FIG. 7, as given in the Mathematical Expression 13, the (a×b) number of pixels i of the l-th layer are associated with the elements j of the (l+1)th layer by the (a×b) number of weights $w_{a,b}$ through the convolutional computation in the (Expression 1), in which case the circuits get complicated. To be specific, the error signals $ERROR_{a,b}$ of the (a×b) number of pixels i from the high-order layer and the (a×b) number of inputs $y_{a,b}$ of the current computing target layer are input to the second sum-of-product computing circuit 112, whereby the second sum-of-product computing circuit 112 implements the sum-of-product computation. The second sum-of-product computing circuit 112 is one example of "a variation generation circuit to generate the variation (deltaW) of the coefficient from the first partial array generated at each stage of the recognition neural network and from the differential value in the first partial array".

Figure 8:
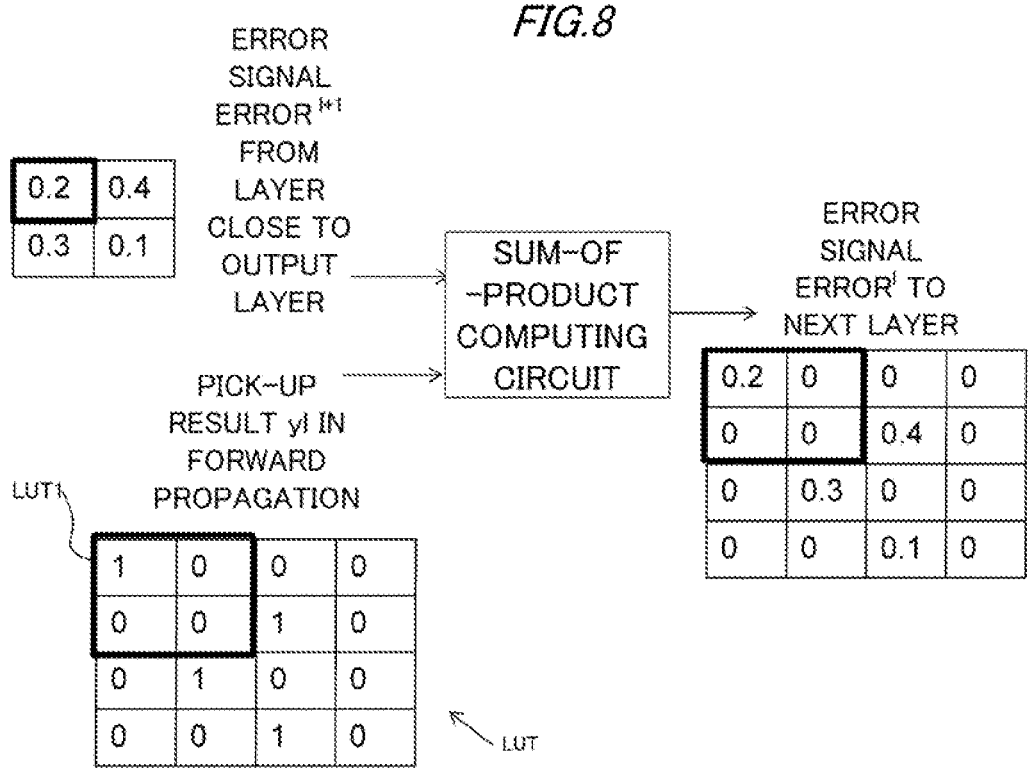
FIG. 8 is a diagram illustrating a configuration of a circuit of a backward propagation pooling layer.

FIG. 8 is a diagram illustrating a configuration of a circuit of the backward propagation (BP) pooling layer (BP pool layer). One example of the circuit of the backward propagation (BP) pooling layer (BP pool layer) is the sum-of-product computing circuit that implements the sum-of-product computation of the error signals $ERROR^{l+1}$ given from the (l+1)th layer that is closer by one layer to the output layer and the Look Up Table LUT. Computed in FIG. 8 is a sum of products of an error value "0.2" of the left upper pixel of the pixels of $ERROR^{l+1}$ and a partial LUT1 of the Look Up Table from the pooling layer with respect to the left upper pixel, and the pixels of the error signals to the next layer are restored. A restored result is that "0.2, 0, 0, 0" defined as a result of the sum-of-product computation are set in left upper four pixels in the pixels of $ERROR^l$. The same sum-of-product computation is implemented for other pixels of $ERROR^l$. The Look Up Table LUT is one example of "an associative relational information representing a associative relation of subsampling for generating the second partial array from the first partial array".

Note that a selector may be used in place of the sum-of-product computing circuit as the circuit of the backward propagation (BP) pooling layer (BP pool layer). To be specific, it may be sufficient that the circuit is configured to output the error signals of the corresponding pixels of the error signals $ERROR^{l+1}$ to the pixels of the error signals $ERROR^l$ corresponding to the pixels with "1" being set in the Look Up Table, and output "0" to the pixels of the error signals $ERROR^l$ of the pixels corresponding to the pixels with "0" being set in the Look Up Table. The circuit of the backward propagation (BP) pooling layer (BP pool layer) in FIG. 8 is one example of "a restoration circuit to restore the first partial array on the basis of the associative relational information (LUT) representing the associative relation of subsampling for generating the second partial array from the first partial array and the generated differential value".

Figure 9:
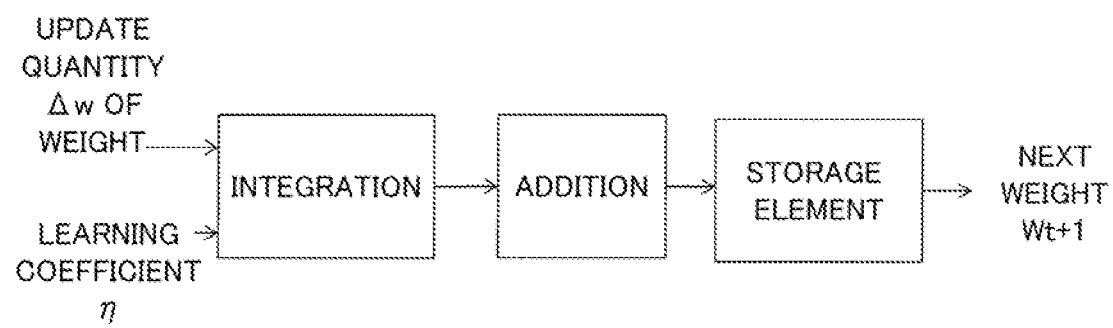
FIG. 9 is a diagram illustrating a configuration of an updater to generate a next weight.

FIG. 9 is a diagram illustrating a configuration of the updater to generate the next weight Wt+1. The updater can be attained as a circuit to integrate the update quantity deltaW of the weight explained in FIG. 7 and the learning coefficient eta (η) and to cumulate the integrated result. The cumulating circuit includes an addition circuit and a storage element. The configuration in FIG. 9 executes the process corresponding to the (Expression 14). The updater in FIG. 9 is one example of "an update circuit to generate a coefficient to be handed over to each stage of the recognition neural network by sequentially integrating generated variations".

The processes by the neural network in FIGS. 4 and 5 will hereinafter be described. The description will start with the process in the learning phase. In the learning phase, the input image is input to the recognition chip 2, and the correct data are input to the learning chip 1. In the recognition chip 2, the convolutional layer (Conv layer) performs the sum-of-product computation of the input image and the weight w given from the FIFO of the memory chip 3, and the computation of the activation function, and hands over computed results to the pooling layer (max pooling layer). Hereat, the computing circuit of the convolutional layer (Conv layer) stores the output y and the weight w in the FIFO of the memory chip 3.

The next pooling layer (max pooling layer) acquires (picks up) the maximum value of the unit rectangular areas (e.g., the (a×b) number of pixels) from the outputs of the convolutional layer (Conv layer), and hands over an acquired result to the next convolutional layer (Conv layer). Hereat, the Look Up Table LUT retains which coordinate (i.e., which pixel) the maximum value is acquired (picked up) from. The next convolutional layer (Conv layer) and the next pooling layer (max pooling layer) execute the same processes. The Fully connected layer performs the same operation as the convolutional layer (Conv layer) does, in which a determiner determines the output, and the distinguishing result is sent to the learning chip 1.

The learning chip 1 computes a difference between the distinguishing result sent from the recognition chip 2 and the correct data, and thus computes the error. The Back Propagation (BP) Fully connected layer computes the error to the next layer by using the output y and the weight w of the recognition chip 2 together, and sends, to the updater, the update quantity deltaW given to the next weight wt+1 as illustrated in FIG. 7. This weight wt+1 is sent to the FIFO of the memory chip 3, and the FIFO retains the weight wt+1 so as to be fetched at timing of changing the coefficient of the convolutional layer (Conv layer).

The errors propagated from the backward propagation Fully connected layer (BP Fully connected layer) are restored into the image segment having the size before being subsampled on the basis of the Look Up Table (LUT) sent via the buffer of the memory from the pooling layer of the recognition chip 2 at the backward propagation pooling layer (BP Pool layer). In other words, the backward propagation pooling layer (BP Pool layer) propagates the errors directly to the pixels of the coordinates taking the maximum values but returns "0" to other pixels, thereby restoring the image segments having the size before being subsampled. Similarly, the processing is carried out by the backward propagation convolutional layer (BP cony layer), the backward propagation pooling layer (BP Pool layer) and the backward propagation convolutional layer (BP cony layer).

Hereat, each backward propagation convolutional layer (BP conv layer) computes the next coefficient, and the recognition chip 2 uses the coefficient for recognizing a new image.

In the recognition phase, the coefficient of the memory chip is fixed, and therefore the recognition chip 2 generates a distinguishing result of a distinguishing target image by executing the same process as in the learning phase, and outputs the generated result.

Figure 10:
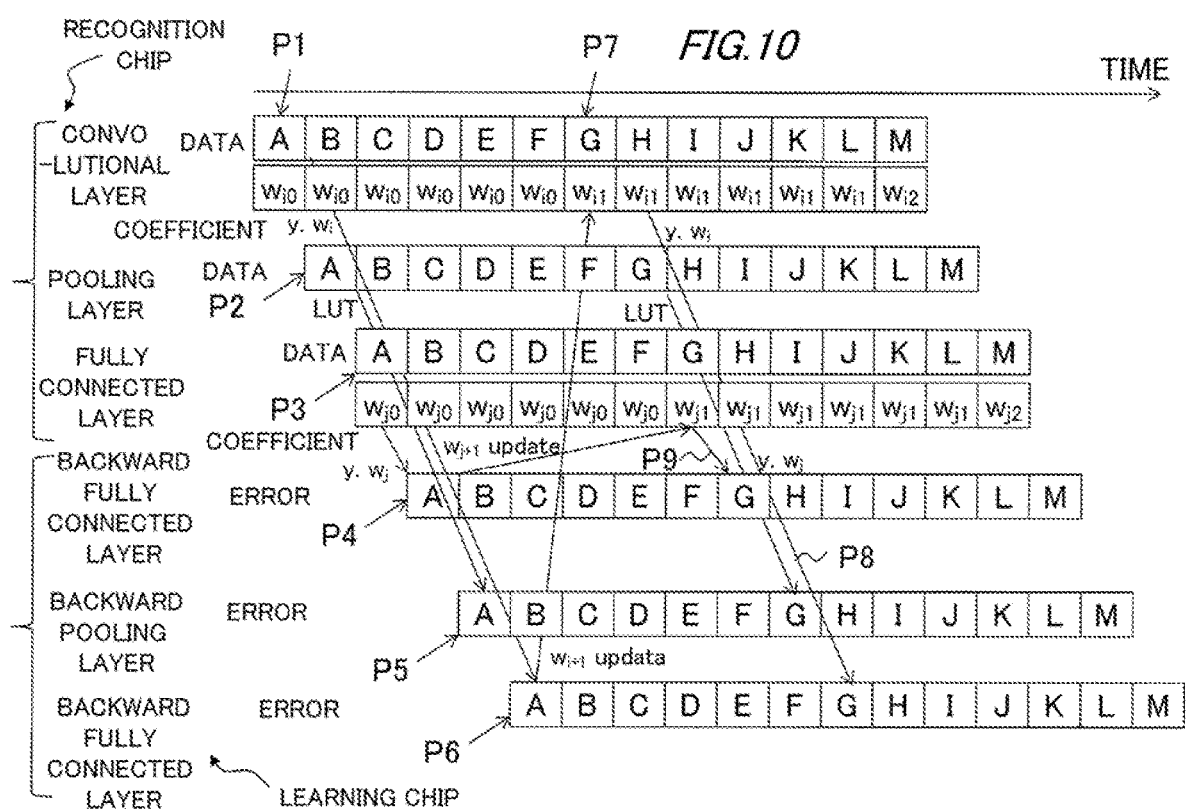
FIG. 10 is a diagram illustrating a timing diagram of a neural network configured to include the convolutional layer, one pooling layer and one Fully connected layer.

FIG. 10 illustrates a timing diagram of the neural network configured to include the convolutional layer, one pooling layer and one Fully connected layer. Exemplified herein are operations of the learning chip 1 and the recognition chip 2 in the learning phase. While in the recognition phase, the learning chip 1 does not operate, but the recognition chip 2 performs the operation. In FIG. 10, respective input images are notated by rectangles surrounding A, B, . . . , M.

In the recognition chip 2, the convolutional layer implements the sum-of-product computation of the input data and the weight w given from the FIFO of the memory chip 3, and a computation of the activation function, and hands over results thereof to the pooling layer. Hereat, the FIFO of the memory stores the output y and the weight w of the convolutional layer (process P1). The output y and the weight w stores in the FIFO are used in a phase of a below-mentioned process P6.

The next pooling layer acquires (picks up) the maximum values in the respective unit rectangular areas (the (a×b) number of pixel areas) from the outputs of the convolutional layer, and hands over the acquires results to the next convolutional layer. When processing by the pooling layer, the Look Up Table LUT retains which coordinate (i.e., which pixel) the maximum value is acquired (picked up) from (process P2). The Look Up Table LUT is used in a phase of a below-mentioned process P5. The Fully connected layer performs the same operation as the convolutional layer does, the determiner determines the output, and the distinguishing result is sent to the learning chip 1 (process P3).

The learning chip 1 computes the error by computing the difference between the distinguishing result set from the recognition chip 2 and the correct data. The backward propagation (BP) Fully connected layer computes an error to the next layer by using the foregoing error and the output y and the weight Wt of the recognition chip 2 together, and sends the update quantity deltaW given to the next weight Wt+1 to the updater (process P4). This weight Wt+1 after being updated is sent to the FIFO of the memory chip 3, and the FIFO retains the weight Wt+1 so as to be fetched upon being used for the computation for the next image by updating the weight of the convolutional layer (process P9).

The errors propagated from the backward propagation Fully connected layer (BP Fully connected layer) are restored into the pixels of the pixel array of the next layer by the backward propagation pooling layer (BP Pool layer). To be specific, the backward propagation pooling layer hands over the errors to the pixels of the pixels taking the maximum values but "0" to other pixels on the basis of the Look Up Table LUT sent via the FIFO of the memory chip 3 from the pooling layer (Pooling layer) of the recognition chip 2, thereby restoring the pixel array (image) having the size before being subsampled (process P5). The last backward propagation convolutional layer computes the next weight, and the computed weight is used for recognizing a new image in the recognition chip 2 via the updater and the FIFO of the memory chip 3 (process P6 through process P7).

The processing advances in the recognition chip 2 and the learning chip 1 while updating the weight as described above, whereby the learning operation is carried out.

Figure 11:
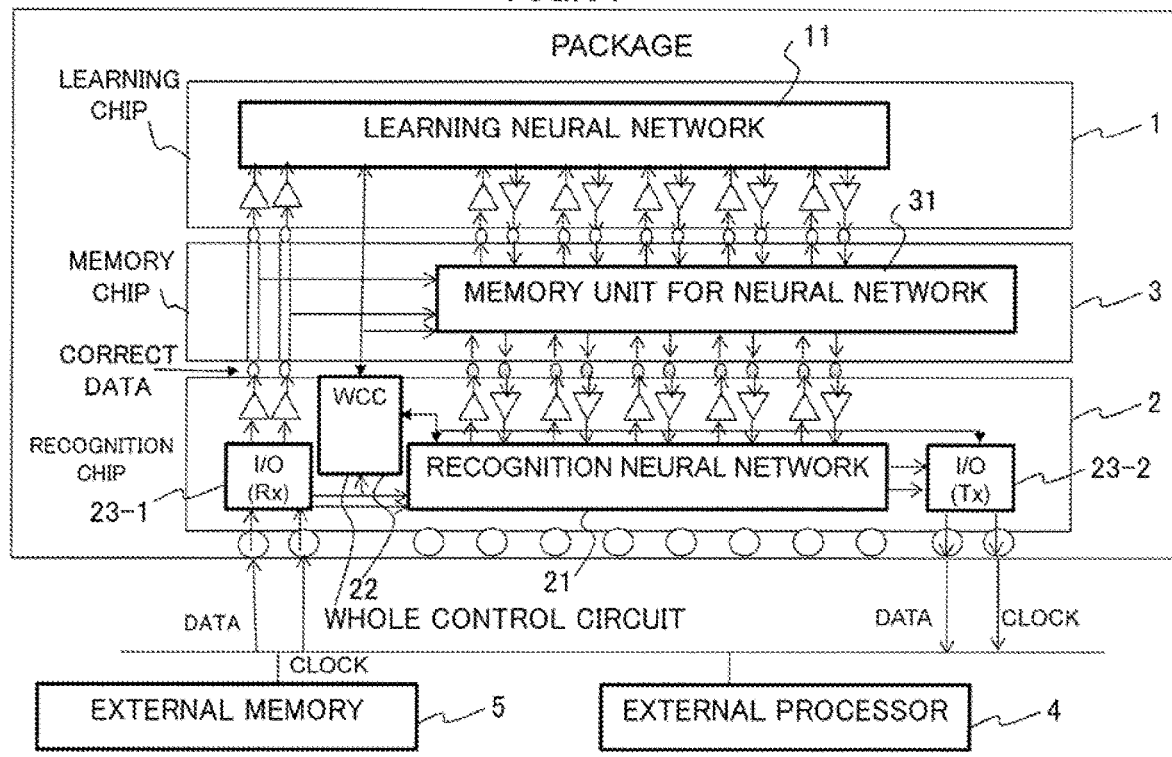
FIG. 11 is a diagram illustrating an example of the neural network including two convolutional layers, two pooling layers and one Fully connected layer at a package level.

FIG. 11 illustrates an example of a neural network including two convolutional layers, two pooling layers and one Fully connected layer at a package level. In FIG. 11, signals from outside are received by an I/O circuit Rx 23-1 within the recognition chip 2 via a bump of a package while being synchronized with, e.g., data clocks. In FIG. 11, an external processor 4 and an external memory 5 are instanced as external signal transmission/reception destinations.

The external processor 4 transmits the signals to a whole control circuit 22 or a recognition neural network 21 in the recognition chip 2 via the I/O circuit Rx 23-1, and further transmits the correct data to the learning chip 1. The distinguishing result and a completion signal from the whole control circuit 22 are transmitted to the external processor 4 via the I/O circuit Tx 23-2 while being synchronized with the data clocks, and are outputted therefrom.

The whole control circuit 22 performs resetting and setting the parameters in the recognition neural network 21, a memory unit 31 and a learning neural network 11. Then, the whole control circuit 22 receives completion notifications from the respective blocks, and notifies an outside of the chip of the completions via the I/O circuit Tx 23-2.

The recognition neural network 21, the memory unit 31 and the learning neural network 11 are connected via Through Silicon Via (TSV) and are thereby enabled to transmit and receive the signals to and from the blocks. The memory unit 31 is one example of "a memory and "a second memory".

Herein, it does not mean that the external processor 4 is limited to a single CPU, but a multiprocessor configuration may also be taken. The single CPU connected by a single socket may have a multicore configuration. In the embodiment, at least part of the processes involving cooperation with the neural network may be executed by dedicated processors other than CPU, which are instanced by a Digital Signal Processor (DSP), a Graphics Processing Unit (GPU), a numeric data processor, a vector processor, and an image processing processor. At least part of the processes may also be executed by an Integrated Circuit (IC) and other digital circuits. At least part of the units described above may include analog circuits. The IC includes circuits called an LSI, and Application Specific Integrated Circuit (ASIC) and a Programmable Logic Device (PLD). The PLD includes, e.g., a Field-Programmable Gate Array (FPGA). The external processor 4 may also be an assembly of the CPU and the IC. The assembly is called, e.g., a Micro Controller Unit (MCU) a System-on-a-Chip (SoC), a system LSI, and a chipset. The external processor 4 is one example of "a processor".

An external memory 5 is a device that stores, e.g., images, sounds/voices and other data, and includes devices called a DRAM, an SRAM and other equivalent memories. The external memory 5 may also be a USB, a memory, an SSD and other equivalent devices. The neural network, the external processor 4 and the external memory 5 are one example of "information processing apparatus". The present information processing apparatus executes a variety of data recognition processes at a high speed by using the neural network described in the embodiment. The external memory 5 is one example of "a first memory".

Figure 12:
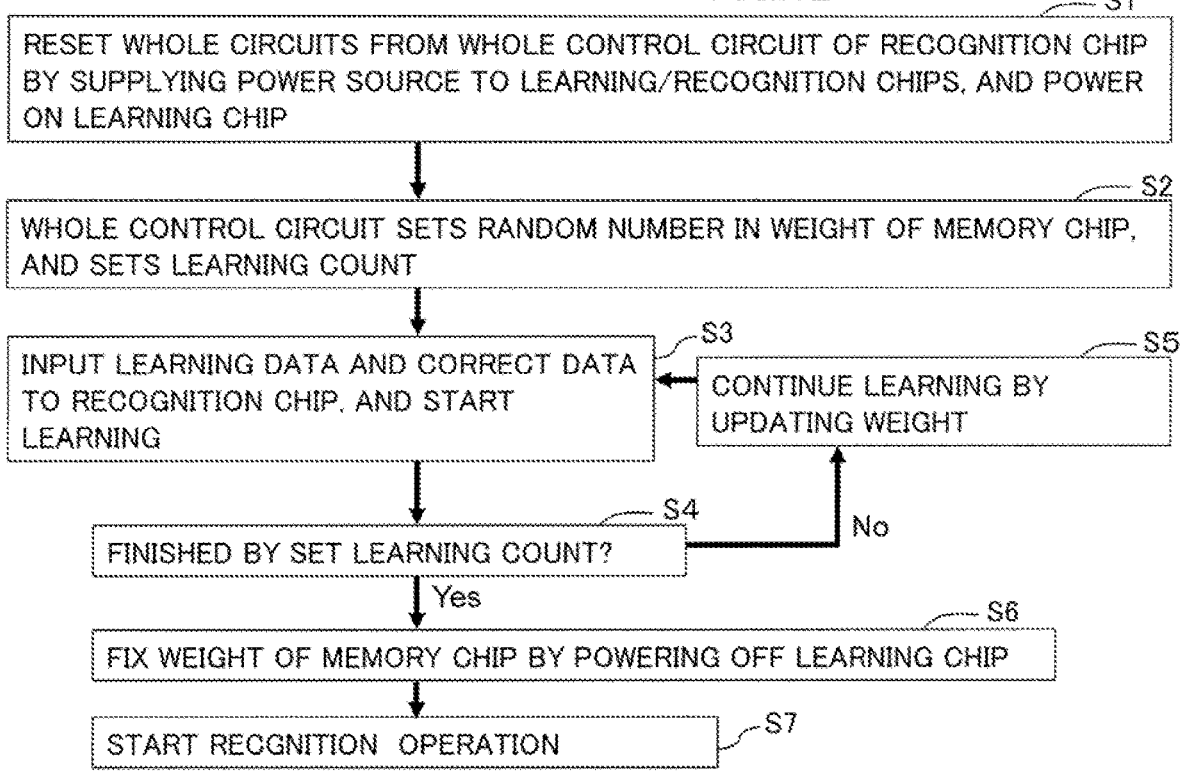
FIG. 12 is an example of a flowchart of processes by the neural network.

FIG. 12 illustrates a flowchart of processes by the neural network in the embodiment. In the neural network, at first, the learning chip 1, the recognition chip 2 and the memory chip 3 are supplied with electric power upon switching on a power source. Then, the whole control circuit 22 of the recognition chip 2 resets the whole circuits (S1).

Next, the whole control circuit 22 sets a random number for the weight of the memory chip 3. The whole control circuit 22 further sets a learning count (S2). The learning count is a number of images used in the learning phase. An external computer (CPU, processor and other equivalent computing units) inputs the learning data and the correct data to the recognition chip 2, and the learning starts (S3). The whole control circuit 22 determines whether the learning of the input images corresponding to the set learning count is all finished (S4). When the learning of the input images corresponding to the set learning count is not yet finished, the whole control circuit 22 continues learning by updating the weight (S5). Whereas when the learning of the input images corresponding to the set learning count is all finished, the whole control circuit 22 fixes the weight of the memory chip by powering off the learning chip (S6). The whole control circuit 22 starts a recognition operation (S7).

Figure 13:
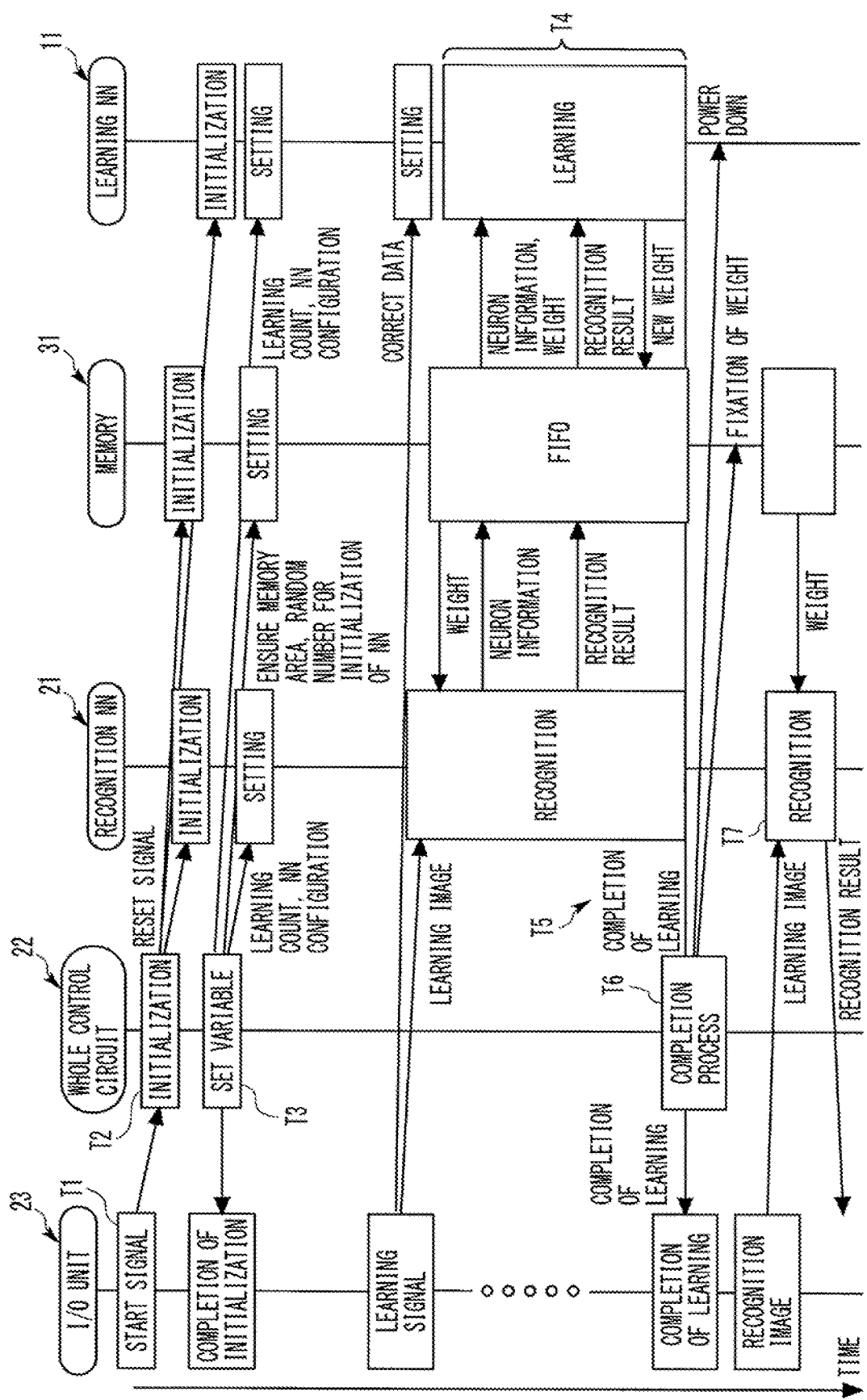
FIG. 13 is a diagram illustrating a processing sequence of the neural network.

FIG. 13 illustrates a processing sequence of the neural network. The whole control circuit 22, upon receiving a START signal from the external computer (CPU, processor and other equivalent computing units) via an I/O unit 23, transmits a RESET signal to a recognition neural network 21, the memory unit 31 and the learning neural network 11, thereby carrying out initialization (T2). Note that the I/O unit 23 corresponds to the I/O circuit Rx 23-1 and the I/O circuit Tx 23-2 in FIG. 11. Thereafter, the whole control circuit 22 sets the learning count in the recognition neural network 21 and the learning neural network 11, and gives a random number as an initial value of the weight of the neural network to the memory unit 31 (T3). In the embodiment, the learning count and the initial value of the weight are called variables.

Next, the whole control circuit 22 transmits an initialization complete signal to the external computer (CPU, processor and other equivalent computing units) via the I/O unit 23.

Upon receiving the initialization complete signal, the learning signal is input to the whole control circuit 22 via the I/O unit 23 from the external computer (CPU, processor and other equivalent computing units), and then the neural networks implement learning. Specifically, the learning neural network 11, the recognition neural network 21 and the memory unit 31 communicate neuron information, the weights and the recognition results via the TSVs. The learning neural network 11 supplies a newly computed weight to the recognition neural network 21 via the FIFO of the memory unit 31 (T4). After completing the learning of the images corresponding to the set learning count, the learning neural network 11 and the recognition neural network 21 notify the whole control circuit 22 of the learning complete signals (T5).

Then, the whole control circuit 22 fixes the weight of the memory unit 31, then powers down the learning chip 1, and notifies the external computer (CPU, processor and other equivalent computing units) that the learning is completed (T6). Thereafter, the neural networks move to the recognition phase (T7). The external computer (CPU, processor and other equivalent computing units) inputs a recognizing target image to the recognition chip 2, causes the recognition chip 2 to execute the recognition process, and causes a cognition result to be output via the I/O unit 23.

Effect of Embodiment

FIG. 14 is one example of a plan view of the chips of the neural network according to the embodiment. The neural network according to the embodiment has such a 3-dimensional structure that the memory unit 31 is interposed between the learning neural network 11 and the recognition neural network 21. In FIG. 14, however, for facilitating a comprehension, the learning neural network 11 and the recognition neural network 21 are so depicted as to be shifted in position, while the memory unit 31 is omitted. As illustrated in FIG. 14, when viewing over upper surfaces of the chips, it is understood that the learning neural networks 11 and the recognition neural networks 21 are configured substantially in superposition. For example, supposing that the I/O unit 23 not used in the recognition phase occupies 10% of the recognition neural network 21 and other circuits not used in the recognition phase occupy 20% thereof, 70% circuits in terms of its planar dimension are usable in the recognition phase, thereby enabling attainment of a higher usage rate of the planar dimension than by the configuration of the comparative example as in FIG. 3.

According to the embodiment, the present neural network enables a cost for the semiconductor process to be restrained by separating the memory chip 3, the learning chip 1 including the computing circuit, and the recognition chip 2 from each other. The present neural network is configured such that the memory chip 3 is disposed between the learning chip 1 defined as the first layer on which to dispose the learning neural network 11, and the recognition chip 2 defined as the second layer on which to dispose the recognition neural network 21. This configuration enables the present neural network to accelerate the processing. The present neural network restrains such a structure that the paths between the memory chip 3, the learning chip 1 including the computing circuit and the recognition chip 2 are arranged to reduce structures of the bundle of wires, and thereby enables a restraint of a decrease in usage efficiency of the planar dimension of the chip.

The learning neural network 11 can acquire the error of the distinguishing result by the comparison circuit 12 that compares the distinguishing result as the output value from the recognition neural network 21 with the correct data given from the external processor 4. The learning neural network 11 can acquire the error of the pixel array input to the Fully connected layer in the recognition neural network 21 by the backward propagation Fully connected layer with respect to the error of the distinguishing result. The learning neural network 11 can compute a weight (i.e., a coefficient) of the convolutional computation that is to be set next and the error of the pixel array at the low-order layer from the pixel array input to the Fully connected layer of the recognition neural network 21 from the FIFO of the memory chip 3 and the weight (i.e., the coefficient) of the convolutional computation. In this case, the learning neural network 11 can compute the weight (i.e., the coefficient) of the convolutional computation that is to be set next and the error of the pixel array at the low-order layer by the two sum-of-product computing circuits illustrated in FIG. 7.

The backward propagation pooling layer can acquire the Look Up Table indicating the subsampling process from the pooling layer of the recognition neural network 21, and is thereby enabled to restore the pixel array of the low-order layer before being subsampled from the errors of the pixel array input to the Fully connected layer. In this case, the learning neural network 11 can restore the pixel array of the low-order layer before being subsampled by the sum-of-product computing circuit illustrated in FIG. 8 or by the selector.

The backward propagation convolutional layer and backward pooling layer execute the processes described above along the pipeline iteratively down to the low-order layer, and thus can compute the errors of the pixel arrays at the respective layers and the weight (i.e., the coefficient) of the convolutional computation that is to be set next. The computed weight of the convolutional computation, which is to be set next, can be handed over to the recognition chip 2 at the predetermined timing via the FIFO of the memory chip 3. On the other hand, the respective layers of the recognition chip 2 can hand over the recognition results and the weights used for the cognition to the respective layers of the learning chip at the predetermined timing via the FIFO of the memory chip 3.

Each of the backward propagation convolutional layers of the learning neural network 11 can acquire the Look Up Table LUT defined as the associative relational information at the pooling layer and the pixel array corresponding to the recognition result (the result of the convolutional computation), which are given by the recognition neural network 21. Accordingly, the learning neural network 11 can generate the weight Wt+1 handed next over to each stage of the recognition neural network by using the generated error at each stage. In this case, the learning neural network 11 can generate the weight Wt+1 by the updater illustrated in FIG. 9.

Modified Example

The embodiment discussed above so far has exemplified the neural network that implements the recognition of the input image, but it does not mean that the processing target of the present neural network is limited to the image information. The present neural network is capable of processing input data, e.g., data of a one-dimensional array, a two-dimensional array, or three-or-higher-dimensional arrays to which the convolutional computations as given in the (Expression 1) and (Expression 3) may be applicable.

The embodiment discussed above has exemplified the pooling layer that implements the max pooling; and, however, the pooling layer may implement the pooling using average values of the pixels of the array. The pooling layer may not use the Look Up Table LUT when implementing the pooling using the average values. For example, when the pooling layer implements the pooling by computing the average values of a segment of an n-number of pixels, the backward propagation pooling layer computes a value of E/n by dividing the error E on the high-order side by a segment count (a number of pixels of the unit rectangular area before being subsampled) n, and hands over, it may be sufficient, the computed value E/n as the error of the current layer, namely, as the value of each segment (pixels) to the convolutional layer.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An arithmetic processing circuit comprising:
 a first chip configured to dispose a learning neural network to compute a coefficient to be set in a recognition neural network, the coefficient having a initial value, wherein the recognition neural network is configured to recognize input data by using the initial value or the coefficient computed on a basis of a recognition result of the recognition neural network with respect to the input data serving as a reference for computing the coefficient and a recognition result serving as a reference with respect to the input data serving as the reference;
 a second chip configured to dispose the recognition neural network to recognize the input data by the coefficient computed by the initial value or the learning neural network; and
 a third chip disposed between the first chip and the second chip, and the third chip configured to dispose a memory connected to both of the learning neural network and the recognition neural network, the memory including:
  first FIFO (First In First Out) circuits configured to hand over computation results from each layer of the recognition neural network to each layer of the learning neural network wherein a number of stages of the first FIFO circuits decreases one by one as a layer number of the recognition neural network increases from an input layer that receives the input data, upward to an output layer that outputs the recognition results; and
  second FIFO (First In First Out) circuits to hand over computation results from the each layer of the learning neural network to the each layer of the recognition neural network wherein a number of stages of the second FIFO circuits decreases one by one as a layer number of the learning neural network decreases from a layer corresponding to the output layer, downward to a layer corresponding to the input layer.

2. The arithmetic processing circuit according to claim 1, wherein the input data are data containing array data,
 the recognition neural network includes:
  a generation circuit to generate reduced array data from the array data, being configured by connecting, at a plurality of layers, one or more pairs of:
   a computing circuit to generate a first partial array by a sum-of-product computation of elements contained in part of the array data and the coefficient corresponding to the elements per part of the array data and by a predetermined function computation; and
   a subsampling circuit to generate a second partial array by subsampling elements from the first partial array generated per part of the array data; and
  an output circuit in the output layer to compute a sum of product of elements of the reduced array data and a coefficient corresponding to the elements of the reduced array data, and to output an output value as one of the recognition results with a predetermined function computation, and
 the learning neural network includes:
  a comparison circuit to compare the recognition result serving as the reference with respect to the input data serving as the reference with the output value from the output circuit; and
  a coefficient generation circuit configured by connecting, at a plurality of layers, one or more pairs of:
   a backward propagation computing circuit provided corresponding to the output circuit and respective layers of the generation circuits, and configured to generate a coefficient to be handed over to the output circuit and to each layer and a differential value of a first partial array on a basis of the differential value given by the comparison result of the comparison circuit; and a restoration circuit to restore the first partial array on a basis of associative relational information representing an associative relation of the subsampling for generating the second partial array from the partial array, and the generated differential values.

3. The arithmetic processing circuit according to claim 2, wherein each layer of the recognition neural network hands over the associative relational information, the first partial array generated by the computing circuit at each layer and the coefficient used in the computing circuit at each layer of the recognition neural network to the computing circuit at each stage of the learning neural network at predetermined operation timing, each layer of the learning neural network hands over the coefficient generated by the computing circuit at each layer of the learning neural network to the computing circuit at each layer of the recognition neural network at the predetermined operation timing.

4. The arithmetic processing circuit according to claim 3, wherein each layer of the learning neural network includes:

a variation generation circuit to generate a variation of the coefficient from the first partial array generated at each layer of the recognition neural network and the differential value in the first partial array; and an update circuit to generate a coefficient to be handed over to each layer of the recognition neural network by sequentially integrating generated variations.

5. An information processing apparatus comprising:

a processor;

a first memory; and an arithmetic processing circuit, the arithmetic processing circuit including:

a first chip configured to dispose a learning neural network to compute a coefficient to be set in a recognition neural network, the coefficient having an initial value, wherein the recognition neural network is configured to recognize input data from the first memory by using the initial value or the coefficient computed on a basis of a recognition result of the recognition neural network with respect to the input data serving as a reference for computing the coefficient and a recognition result serving as a reference with respect to the input data serving as the reference in accordance with control of the processor;

a second chip configured to dispose the recognition neural network to recognize the input data by the coefficient computed by the learning neural network; and a third chip disposed between the first chip and the second chip, and configured to dispose a second memory connected to both of the learning neural network and the recognition neural network, the second memory including:

first FIFO (First In First Out) circuits configured to hand over computation results from each layer of the recognition neural network to each layer of the learning neural network wherein a number of stages of the first FIFO circuits decreases one by one as a layer number of the recognition neural network increases from an input layer that receives the input data, upward to an output layer that outputs the recognition results; and second FIFO (First In First Out) circuits to hand over computation results from the each layer of the learning neural network to the each layer of the recognition neural network wherein a number of stages of the second FIFO circuits decreases one by one as a layer number of the learning neural network decreases from a layer corresponding to the output layer, downward to a layer corresponding to the input layer.

* * * * *